United States Patent
Leone

(10) Patent No.: US 8,063,130 B2
(45) Date of Patent: Nov. 22, 2011

(54) PUMP OR VALVE SEAL

(75) Inventor: Patrice Leone, Acquigny (FR)

(73) Assignee: Valois SAS, Le Neubourg (FR)

( * ) Notice: Subject to any disclaimer, the term of this patent is extended or adjusted under 35 U.S.C. 154(b) by 203 days.

(21) Appl. No.: 12/521,426

(22) PCT Filed: Dec. 21, 2007

(86) PCT No.: PCT/FR2007/052611
§ 371 (c)(1),
(2), (4) Date: Jun. 26, 2009

(87) PCT Pub. No.: WO2008/087352
PCT Pub. Date: Jul. 24, 2008

(65) Prior Publication Data
US 2010/0314841 A1    Dec. 16, 2010

(30) Foreign Application Priority Data

Dec. 28, 2006 (FR) .................................. 06 55998
Jul. 4, 2007 (FR) .................................. 07 56266

(51) Int. Cl.
*C08K 3/26* (2006.01)
*F16J 15/10* (2006.01)

(52) U.S. Cl. .................................. 524/425; 277/650
(58) Field of Classification Search .................. 524/425
See application file for complete search history.

(56) References Cited

U.S. PATENT DOCUMENTS

| 2,938,011 | A | * | 5/1960 | Wormuth | .................. 523/220 |
|---|---|---|---|---|---|
| 3,783,091 | A | | 1/1974 | Leslie et al. | |
| 6,780,929 | B1 | | 8/2004 | Leone | |
| 2005/0131156 | A1 | * | 6/2005 | Sawada et al. | .................. 525/233 |
| 2005/0241636 | A1 | * | 11/2005 | Ohbi et al. | .................. 128/200.23 |
| 2006/0273117 | A1 | * | 12/2006 | Barranco et al. | .......... 222/402.2 |

FOREIGN PATENT DOCUMENTS

| FR | 2 787 424 A1 | 6/2000 |
|---|---|---|
| FR | 2 855 829 A1 | 12/2004 |
| GB | 2 410 500 A | 8/2005 |
| JP | 09137029 A * | 5/1997 |
| WO | 97/01611 A | 1/1997 |

OTHER PUBLICATIONS

Translation of JP 09137029, May 1997.*

* cited by examiner

*Primary Examiner* — Ling Choi
*Assistant Examiner* — Hui Chin
(74) *Attorney, Agent, or Firm* — Sughrue Mion, PLLC

(57) ABSTRACT

A pump or valve gasket for a fluid dispenser device, said gasket comprising at least one elastomer and at least one basic inorganic filler having pH that is greater than or equal to 8.

29 Claims, 1 Drawing Sheet

PUMP OR VALVE SEAL

The present invention relates to a pump or valve gasket and to a fluid device including such a gasket.

More particularly, the gaskets of the invention are adapted to be used firstly in dispenser devices that dispense fluid under pressure and that include a valve, in particular a metering valve, and secondly in fluid dispenser devices that are not pressurized and that include a pump.

Gaskets used in the context of dispenser devices that dispense fluid under pressure, such as aerosol devices, need to satisfy a certain number of conditions, and fulfill certain requirements. Thus, such gaskets should provide good mechanical properties, should present appropriate swelling properties relative to the propellant, should provide an adequate coefficient of friction, should be leaktight to the propellant, and should have the ability to withstand humidity. In particular, such characteristics are particularly important for dynamic gaskets that provide sealing between the movable valve member of the valve and the valve chamber that contains the dose to be expelled.

Gaskets used in non-pressurized fluid dispenser devices, and in particular in pumps, also need to satisfy various conditions and fulfill a certain number of requirements. Thus, such gaskets should have the ability to withstand heat, should be impermeable to gases, and obviously should not be toxic. They should also withstand solutions, in particular water/ethanol solutions. They should have the ability to withstand humidity, chemical agents, solvents, acids, bases, and guarantee the ability to withstand preservatives, such as quaternary ammonium compounds, and have the ability to withstand microbiological attacks and inorganic salt solutions.

Poor chemical compatibility between the gasket and the substance contained in the dispenser can lead to migration between the gasket and the contents.

For example, for pharmaceutical formulations with which the gaskets are in contact, extractable compounds can be found that are potential migrants. Amongst such compounds: oligomer residues; residual solvents; vulcanizing agents; antioxidants; lubricants; plasticizers; and other substances can be found.

Fluids in contact with the gasket can in particular have several types of harmful influence.

The gasket risks being subjected to a chemical attack by fluids that are in contact therewith. In this event, the material degrades, with the gasket possibly becoming broken, soft, or covered in cracks. Naturally, there is then a risk of the sealing being broken.

In addition, the absorption by the gasket of the fluid that is in contact therewith can lead to the gasket swelling, and that can have several consequences, such as a change in the properties of the material of the gasket, stiffening, expulsion of the gasket as a result of lack of space.

The extraction of a compound from the gasket by the fluid that is in contact therewith can also lead to a change in the properties of the material, and a reduction in the section of the gasket can possibly lead to leaks.

The mechanical and physico-chemical properties need to be taken into consideration just as much as chemical compatibility. The flexibility of the gasket, its ability to withstand repeated flexing, and its ability to withstand friction have a considerable influence on the life span of the gasket.

The elasticity properties, such as compression set, can influence the ability of the gasket to behave well in a particular application. Compression set is essentially a measurement of the capacity of the gasket to maintain its sealing force and thus perform its function. The value of the compression set depends on conditions of operation and on its duration.

An object of the present invention is thus to provide pump or valve gaskets that satisfy the above-mentioned requirements well.

Another object of the present invention is to provide a pump or valve gasket that makes it possible to improve the elastic properties and the compatibility of the gasket with active principles.

Another object of the present invention is thus to provide gaskets that are capable of offering increased life time and operating life as a result of combining their elasticity, compression set, and chemical compatibility properties.

Another object of the present invention is to provide pump or valve gaskets that are simple and inexpensive to manufacture.

The present invention thus provides a pump or valve gasket for a fluid dispenser device, said gasket comprising at least one elastomer and at least one basic inorganic filler having pH that is greater than or equal to 8.

Advantageously, said at least one basic inorganic filler comprises aluminum hydroxide ($Al(OH)_3$).

Advantageously, said at least one basic inorganic filler comprises aluminum oxide hydroxide (AlOOH).

Advantageously, said at least one basic inorganic filler comprises magnesium hydroxide ($Mg(OH)_2$).

Advantageously, said at least one basic inorganic filler comprises diatomaceous earth.

Advantageously, said at least one basic inorganic filler comprises wollastonite.

Advantageously, said at least one basic inorganic filler comprises a synthetic substance.

Advantageously, said at least one basic inorganic filler comprises magnesium and sodium aluminosilicate.

Advantageously, said at least one basic inorganic filler comprises silica having pH that is greater than or equal to 8.

Advantageously, said at least one basic inorganic filler comprises chalk (calcium carbonate).

Advantageously, said at least one elastomer comprises one or more of the following components: nitrile rubber (NBR); hydrogenated nitrile rubber (HNBR); polychloroprene rubber (CR); ethylene propylene (EP); ethylene propylene diene (EPDM); elastomer polyolefin, such as polyoctene ethylene (POE) or polybutene ethylene (PBE); butyl rubber (IIR); halobutyl rubber, such as chlorobutyl rubber (CIIR) or bromobutyl rubber (BIIR), and/or ethylene vinyl acetate (EVA).

Advantageously, the gasket further includes at least one other inorganic filler that is associated with said at least one basic inorganic filler.

Advantageously, said at least one other associated inorganic filler comprises kaolin, silica (pH<7), and/or chalk.

Advantageously, said gasket is a static gasket, such as a neck gasket that is disposed between a valve or a pump and a reservoir, and/or a dynamic gasket that is in contact with a movable element, such as a pump piston rod or a valve member.

The present invention also provides a fluid dispenser device including at least one gasket as described above.

Figure 1:
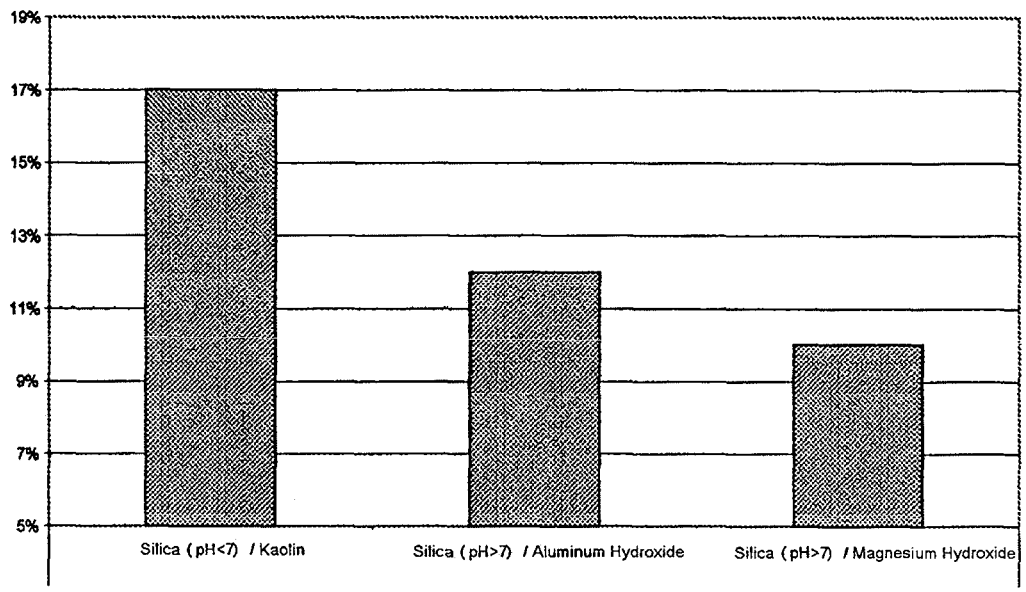
FIG. 1 is a graph showing the compression set.

The gasket of the invention can be used equally well in a fluid dispenser device for dispensing fluid under pressure as in a fluid dispenser device that is not pressurized. It can be used equally well as a static gasket, e.g. a neck gasket providing the sealing between a pump or a valve and a reservoir, and as a dynamic gasket that is in contact with a movable element, e.g. a pump piston rod or a valve member.

In a dispenser that is pressurized, the device includes a valve that is provided with a movable valve member, said valve being mounted on a reservoir containing both the fluid and a propellant with or without alcohol. The propellant comprises an HFC-134a or HFC-227 type gas. The gasket of the invention can thus be used as a neck gasket between the valve and the reservoir and/or as a dynamic gasket through which the valve member slides.

Otherwise, the (non-pressurized) dispenser comprises a pump mounted on a reservoir containing the fluid. By way of example, the gasket of the invention can thus be used between the pump body and the reservoir (static gasket) or against the piston rod (dynamic gasket).

Gasket formulations usually comprise one or more base polymers to which there can in particular be added: inorganic fillers or carbon black fillers; additives; vulcanizing agents; colorants; processing agents; or plasticizers.

The pump or valve gasket of the present invention comprises at least one elastomer and one or more basic inorganic fillers having a pH that is greater than or equal to 8, of which a few examples are given below.

In a first variant, the gasket essentially comprises as its base polymer an NBR or HNBR elastomer. As a valve gasket, it turns out that, in contact with a propellant of the HFC-134a or HFC-227 type, with or without alcohol (e.g. ethanol), this type of elastomer presents excellent mechanical properties, such that it is particularly well adapted to be used as a dynamic gasket. Naturally, it can also be used as a neck gasket in such an aerosol device. It also presents the advantage of being alloyed easily with other elastomer materials, such as polychloroprene rubber (CR), polyoctene ethylene (POE), butyl rubber (IIR), halobutyl rubber (CIIR or BIIR), ethylene propylene (EP), or ethylene propylene diene (EPDM). This makes it possible to optimize the properties of the gaskets, in particular as a function of the type of propellant (HFC-134 or HFC-227, with or without alcohol) and/or as a function of the active principle to be dispensed.

A second variant consists in using polychloroprene rubber (CR) as the base elastomer. Alloys of polychloroprene with, for example, POE and/or CIIR or BIIR and/or EP or EPDM, or HNBR, make it possible to obtain gaskets having good mechanical properties.

In a third variant embodiment, the gasket can contain EP and/or EPDM as the base elastomer. EP and EPDM impart good mechanical properties to the gasket. In addition, compared to other materials, such as nitrile rubber or chloroprene, gaskets having an EPDM base are more inert relative to active principles, and they have very low levels of extractables. Alloys of EP and/or EPDM with, for example, CR, POE, NBR, HNBR, IIR, CIIR or BIIR, EVA make it possible to optimize the properties of the gaskets, in particular as a function of the type of propellant and/or as a function of the active principle to be dispensed.

In a fourth variant embodiment, the gasket can contain an EP, such as POE or PBE, that imparts small-swelling properties to gaskets when in contact with propellants of the HFC type, with or without alcohol.

In another variant, it can also be envisaged to make gaskets that include IIR, or CIIR or BIIR as the base elastomer component. That type of gasket has the ability to withstand humidity and swells little in HFC-type propellants.

In another variant, it can also be envisaged to make gaskets that include EVA as the base elastomer component. That type of gasket also presents good mechanical properties and swells little in contact with HFC-type propellants, with or without alcohol. An alloy of EVA with, in particular, one or more of the above-described elastomer materials (CR, POE, IIR, CIIR, BIIR, EP, EPDM) makes it possible to optimize the properties of gaskets, in particular as a function of the type of propellant and/or of the active principle to be dispensed.

Inorganic fillers are generally used in this type of gasket so as to improve some of their characteristics (mechanical properties, friction, extractables, . . . ).

The gasket materials of the invention comprise one or more basic inorganic fillers in association with at least one elastomer, such as those described above.

Although silicas having acid pH are generally used in metering-valve applications, the gasket of the invention includes at least one basic inorganic filler having pH that is greater than or equal to 8 and that is advantageously selected from the group consisting of: aluminum hydroxide ($Al(OH)_3$); aluminum oxide hydroxide (AlOOH); magnesium hydroxide ($Mg(OH)_2$); diatomaceous earth; wollastonite; magnesium and sodium aluminosilicate; silica having basic pH; and chalk (calcium carbonate).

The basic inorganic fillers used in gaskets of the present invention can also be associated with one or more other inorganic fillers, such as kaolin, silica having acid pH, and/or chalk.

The use of one or more basic inorganic fillers in the gasket materials of the invention makes it possible to improve elasticity properties such as compression set and/or compatibility with the active principle.

Compression set is expressed as a percentage, making it possible to determine the capacity of the rubber to return to its initial dimensions after being deformed.

Compression set testing consists in compressing a rubber pellet (diameter 6 millimeters (mm), thickness 6 mm) through 25% of its initial height. The stress is maintained for 22 hours at 40° C. After removing the stress, the rubber pellet is left to rest for 30 minutes. Then its height is measured once again.

The compression set is calculated as follows:

Compression set (%)=$(Hi-Hf)/(Hi-Hc)$

Hi: initial height

Hf: final height

Hc: compressed height

The smaller the value of the compression set percentage, the greater the elasticity of the material.

As shown on the graph in FIG. 1, representing the influence that the type of inorganic filler has on compression set, gaskets that include silica having basic pH that is greater than or equal to 8 and being associated with aluminum hydroxide, or that include silica having basic pH that is greater than or equal to 8 and being associated with magnesium hydroxide have a compression set (equal to 12% and 10% respectively) that is lower than the compression set (17%) of the gasket that includes silica having acid pH and being associated with kaolin.

Thus, compared to gaskets that include silicas having acid pH, gaskets of the invention that include the above-mentioned type of basic inorganic fillers present a lower compression set value and thus present greater elasticity.

Furthermore, tests, such as testing the degradation of the active principle, have demonstrated that the use of basic inorganic fillers in gaskets of the present invention results in better compatibility of the gaskets relative to the active principles.

Testing the degradation of the active principle consists in inserting five rubber pellets into a bottle, and adding thereto a formulation with an active principle in solution.

The pressurized bottles are placed in an incubator so as to accelerate the aging process.

The quantity of active principle remaining in each bottle is quantified by high performance liquid chromatography (HPLC) at each stability point (T=0, T=2 weeks and T=5 weeks for the active principle studied).

The greater the quantity of active principle remaining, the more compatible the tested material is with the active principle.

Figure 2:
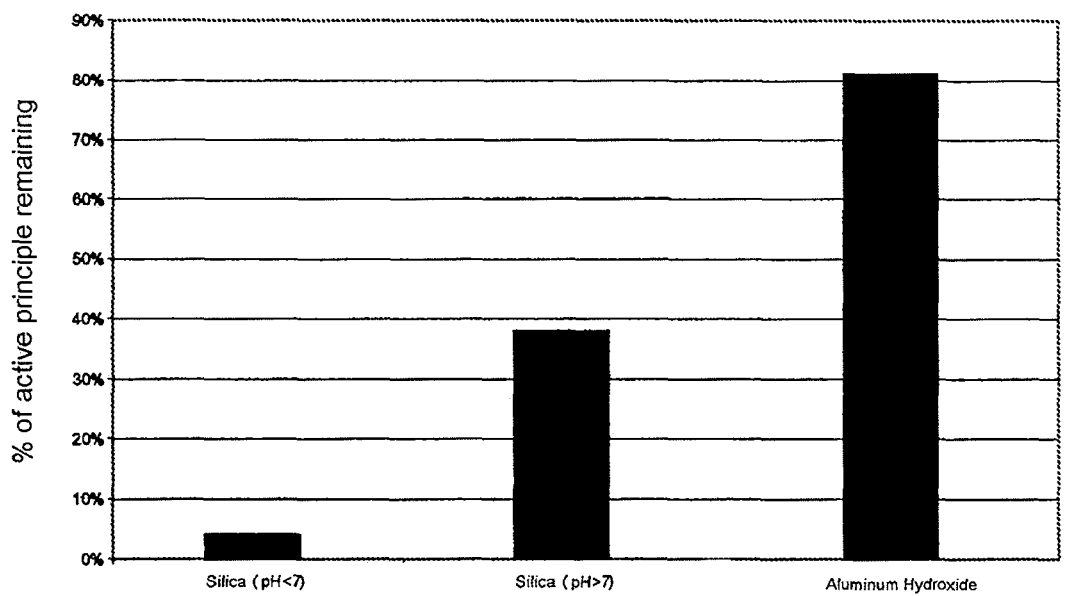
FIG. 2 is a graph showing the degradation of the active principle.

The test results represented on the graph in FIG. 2 show that for the gaskets including basic inorganic fillers, such as silica having basic pH, or aluminum hydroxide, the quantity of active principle remaining (38% and 81% respectively) is greater than for gaskets using acid silica (4%). The gaskets of the present invention that use at least one basic inorganic filler having pH that is greater than or equal to 8, are thus more compatible with the active principle than are gaskets that use only an acid inorganic filler. For the test in FIG. 2, the silica having acid pH had pH=6, the silica having basic pH had pH=9, and the aluminum hydroxide had pH=9.

Ease of manufacture and moderate cost are also advantageous aspects of gaskets of the present invention.

It should be noted that magnesium and sodium aluminosilicate is a synthetic compound. In contrast to substances that are extracted from the ground (e.g. such as magnesium silicate or talc), the cost price of a synthetic substance is lower, and a synthetic compound does not pose a problem of availability or of short supply, since it can be manufactured easily in a laboratory as a function of need. The use of magnesium and sodium aluminosilicate or of some other basic inorganic filler obtained by synthetic means or containing a synthetic compound, is thus advantageous.

Although examples of elastomers and of basic inorganic fillers entering into the composition of gaskets of the present invention are described above with reference to various possible variant formulations for gaskets, the present invention is not limited to those examples, and the ambit of the patent is defined by the accompanying claims.

The invention claimed is:

1. A pump or valve gasket for a fluid dispenser device, wherein said gasket comprises at least one elastomer and at least one basic inorganic filler having pH that is greater than or equal to 8; and wherein said at least one basic inorganic filler comprises aluminum oxide hydroxide (AlOOH).

2. A gasket according to claim 1, wherein said at least one basic inorganic filler comprises aluminum hydroxide (Al(OH)$_3$).

3. A gasket according to claim 1, wherein said at least one basic inorganic filler comprises magnesium hydroxide (Mg(OH)$_2$).

4. A gasket according to claim 1, wherein said at least one basic inorganic filler comprises diatomaceous earth.

5. A gasket according to claim 1, wherein said at least one basic inorganic filler comprises wollastonite.

6. A gasket according to claim 1, wherein said at least one basic inorganic filler comprises a synthetic substance.

7. A gasket according to claim 1, wherein said at least one basic inorganic filler comprises magnesium and sodium aluminosilicate.

8. A gasket according to claim 1, wherein said at least one basic inorganic filler comprises silica having pH that is greater than or equal to 8.

9. A gasket according to claim 1, wherein said at least one basic inorganic filler comprises chalk (calcium carbonate).

10. A gasket according to claim 1, wherein said at least one elastomer comprises one or more of the following components: nitrile rubber (NBR); hydrogenated nitrile rubber (HNBR); polychloroprene rubber (CR); ethylene propylene (EP); ethylene propylene diene (EPDM); elastomer polyolefin; butyl rubber (IIR); halobutyl rubber, and ethylene vinyl acetate (EVA).

11. A gasket according to claim 1, wherein the gasket further includes at least one other inorganic filler that is associated with said at least one basic inorganic filler.

12. A gasket according to claim 11, wherein said at least one other associated inorganic filler comprises kaolin, silica (pH<7), and/or chalk.

13. A gasket according to claim 1, wherein said gasket is a static neck gasket disposed between a valve or a pump and a reservoir, or a dynamic gasket that is in contact with a pump piston rod or a valve member.

14. A fluid dispenser device including at least one gasket according to claim 1.

15. A pump or valve gasket for a fluid dispenser device, wherein said gasket comprising at least one elastomer and at least one basic inorganic filler having pH that is greater than or equal to 8; and wherein said at least one basic inorganic filler comprises magnesium and sodium aluminosilicate.

16. The gasket according to claim 15, wherein said at least one basic inorganic filler comprises aluminum hydroxide (Al(OH)$_3$).

17. The gasket according to claim 15, wherein said at least one basic inorganic filler comprises magnesium hydroxide (Mg(OH)$_2$).

18. The gasket according to claim 15, wherein said at least one basic inorganic filler comprises diatomaceous earth.

19. The gasket according to claim 15, wherein said at least one basic inorganic filler comprises wollastonite.

20. The gasket according to claim 15, wherein said at least one basic inorganic filler comprises a synthetic substance.

21. The gasket according to claim 15, wherein said at least one basic inorganic filler comprises silica having pH that is greater than or equal to 8.

22. The gasket according to claim 15, wherein said at least one basic inorganic filler comprises chalk (calcium carbonate).

23. The gasket according to claim 15, wherein said at least one elastomer comprises one or more of the following components: nitrile rubber (NBR); hydrogenated nitrile rubber (HNBR); polychloroprene rubber (CR); ethylene propylene (EP); ethylene propylene diene (EPDM); elastomer polyolefin; butyl rubber (IIR); halobutyl rubber; and ethylene vinyl acetate (EVA).

24. The gasket according to claim 15, wherein the gasket further includes at least one other inorganic filler that is associated with said at least one basic inorganic filler.

25. The gasket according to claim 24, wherein said at least one other associated inorganic filler comprises kaolin, silica (pH<7) or chalk.

26. The gasket according to claim 15, wherein said gasket is a static neck gasket disposed between a valve or a pump and a reservoir, or a dynamic gasket that is in contact with a pump piston rod or a valve member.

27. A fluid dispenser device including at least one gasket according to claim 15.

28. The gasket according to claim 10, wherein the elastomer polyolefin is polyoctene ethylene (POE) or polybutene ethylene (PBE) and the halobutyl rubber is chlorobutyl rubber (CIIR) or bromobutyl rubber (BIIR).

29. The gasket according to claim 23, wherein the elastomer polyolefin is polyoctene ethylene (POE) or polybutene ethylene (PBE) and the halobutyl rubber is chlorobutyl rubber (CIIR) or bromobutyl rubber (BIIR).

* * * * *